3,117,138
PREPARATION OF PARTIAL GLYCIDYL ETHERS OF POLYOLS
Herbert P. Price, Louisville, Ky., assignor to Devoe & Raynolds Company, Inc., a corporation of New York
No Drawing. Filed May 4, 1960, Ser. No. 26,693
4 Claims. (Cl. 260—348.6)

This invention pertains to the preparation of partial glycidyl ethers of polyhydric alcohols. While glycidyl polyethers of polyhydric alcohols and polyhydric phenols are well known, and are generally prepared by the reaction of epichlorhydrin with all of the phenolic or alcoholic hydroxyl groups of the polyhydric compound followed by dehydrohalogenation, it is virtually impossible to make partial ethers in high yields. The unreacted hydroxyl groups generally undergo reactions either during the epichlorhydrin condensation reaction or during dehydrohalogenation.

In the case of polyhydric phenols, it is impossible to prepare partial glycidyl ethers because even though the amount of caustic can be controlled so that only part of the phenolic hydroxyl groups react with epichlorhydrin during the condensation reaction, it is impossible to dehydrohalogenate the composition without bringing about the reaction of epoxide groups with unreacted phenolic hydroxyls. In other words, either conditions must be such that during condensation, all of the phenolic groups react with epichlorhydrin or else phenolic hydroxyl groups will react with epoxide groups during dehydrohalogenation to form polymeric materials. In either event, insofar as I am aware, glycidyl polyethers of polyhydric phenols having unreacted phenolic groups cannot be made.

Partial glycidyl ethers of polyols have been prepared by a two-step process involving the reacting of the polyol and epichlorhydrin in the presence of a Friedel-Crafts catalyst particularly acidic $BF_3$ catalysts. The preparation of partial glycidyl ethers by this method requires the use of the exact number of mols of epichlorhydrin that it is desired to add to the polyol. For example, to prepare the diglycidyl ether of trimethylol propane, one must use two mols of epichlorhydrin per mol of trimethylol propane. By this process however, yields are very low because of the formation of polymeric halohydrin groups. In addition, it is practically impossible to dehydrohalogenate the polyolepichlorhydrin condensate without polymer formation.

This invention is based on the discovery that even though the process employed in connection with polyhydric phenols is not operative for phenols, the process can be applied to the formation of partial glycidyl ethers of polyols. By this process, the amount of epichlorhydrin which reacts with the polyol is essentially equivalent to the amount of caustic alkali added, and it is not necessary to employ epichlorhydrin in the exact ratio in which it will react with the polyol. It has been found for example, that one mol of caustic alkali per mol of a diol reacted in the presence of excess epichlorhydrin will bring about the reaction of only one mol of epichlorhydrin with the diol thereby forming on dehydrohalogenation, a predominant amount of the monoglycidyl ether of the diol.

A process for producing polyglycidyl ethers of polyhydric alcohols using a procedure similar to the method used in making glycidyl polyethers of polyhydric phenols has been the subject of a recent patent, U.S. 2,898,349. However, by this process, glycidyl ethers of alcohols are made by continuously adding a strong alkali to the alcohol-epichlorhydrin mixture while continuously removing water formed by the reaction. This previous work is concerned with reacting the polyol, in excess epichlorhydrin, with the strong caustic alkali equivalent to or in slight excess over the hydroxyls of the polyol. However, it has now been found, quite unexpectedly, that the amount of caustic alkali need not equal the number of hydroxyl groups in the polyol but is directly proportional to the number of halohydrin ether groups formed. As noted hereinbefore, in connection with the monoglycidyl ether of a diol, two mols of sodium hydroxide when added per mol of trimethylol propane, in excess epichlorhydrin preferentially will add only two mols of epichlorhydrin to the trimethylol propane so that on dehydrohalogenation, the reaction product is predominantly the diglycidyl ether of trimethylol propane. This diglycidyl ether will contain two ether groups, two epoxide groups and one primary hydroxyl group. Infra red analyses bear out this conclusion as shown by the peak heights due to the various components.

By "polyol" as used in this description and in the claims, I mean an alcohol or ether alcohol having at least two hydroxyl groups, all hydroxyl substituents being aliphatic. By "ether alcohol," is intended the aliphatic hydroxy-substituted ethers resulting from the reaction of monoepoxides with dihydric phenols, dihydric alcohols or water. Examples of polyols within the contemplation of this invention are ethylene glycol, propylene glycol, 1,5-pentane diol, tripropylene glycol, tetraethylene glycol, beta hydroxyethyl ethers of polyhydric alcohols and phenols which are liquids at reaction temperature such as the various polyoxy ethylene glycols, the commercially available "Carbowaxes," polyoxy propylene glycols, bis (beta hydrovyethyl ether) of bisphenol, resorcinol, hydroquinone, glycerol, etc. Also included are trimethylol propane, 1,4-dihydroxy cyclohexane, 1,12-dihydroxy octadecane, sorbitol, mannitol, erythritol, pentaerythritol, tripentaerythritol, and the like. Eutectic mixtures of solid polyols with other polyols which form liquids are particularly desirable. Preferred polyols are those whose only hydroxyls are primary aliphatic hydroxyls and which are soluble in epichlorhydrin so that use of a solvent other than epichlorhydrin is unnecessary. While the reaction of epichlorhydrin with bisphenol can be carried out at room temperature to form a halohydrin ether which can be dehydrohalogenated at elevated temperature, the reaction of epichlorhydrin with polyols using caustic alkali as a catalyst does not take place at room temperature. Accordingly, in carrying out the reaction of epichlorhydrin with the polyol to form the partial ethers of the invention, the condensation and dehydrohalogenation reactions are concomitant. The polyolepichlorhydrin-caustic alkali mixture is heated at an elevated temperature, say from 50° C. to 150° C. pressure being used if desired, to bring about the condensation of epichlorhydrin and polyol to form the chlorohydrin ether which is concomitantly dehydrochlorinated to form the partial glycidyl ether of the polyol. The water formed during the reaction is then removed by distillation as an epichlorhydrin-water azeotrope and the product is purified. It is also possible to carry out the reaction while simultaneously azeotropically removing from the reaction mixture, water formed during the reaction as described in U.S. 2,898,349. While any of the alkali metal hydroxides such as potassium hydroxide, sodium hydroxide and lithium hydroxide can be used in this process, caustic alkali is preferred.

The process for producing these various partial glycidyl ethers of polyhydric alcohols can best be understood by reference to the following examples which are included for the purpose of illustration only and are not intended in any way to limit the invention.

*Example 1*

In a one liter, three-neck, round-bottom flask equipped with thermometer and agitator 180 grams of butanediol and 555 grams of epichlorhydrin are heated to a temperature of 80° C. The heat is then removed and 88 grams of flake sodium hydroxide are added in 22 gram increments over a period of one hour. After each addition of sodium hydroxide the exotherm temperature of the reaction mixture is reduced with cool water to 60° C. When all of the sodium hydroxide has been added the flask is fitted for distillation and an epichlorhydrin-water azeotrope is distilled off to 126° C. The remaining solution is filtered through a Buchner funnel using a water aspirator vacuum to remove the sodium chloride present. The sodium chloride is washed with benzene. Then the filtrate is transferred to a one liter distilling flask fitted for vacuum distillation and the excess epichlorhydrin and other solvents present are vacuum distilled off at 120 mm. Hg to 163° C. The resulting composition is an 88 percent yield of the monoglycidyl ether of butanediol. The composition has the following properties:

| | |
|---|---|
| Theoretical epoxide equivalent | 146.0 |
| Actual epoxide equivalent | 173.0 |
| Percent total chlorine content | 1.3 |
| Percent active chlorine content | 1.3 |
| Viscosity | *$A_2$ to $A_1$ |

*Gardner-Holdt.

*Example 2*

In a one liter, three-neck, round-bottom flask fitted for distillation and equipped with a thermometer, 180 grams of butanediol and 555 grams of epichlorhydrin are heated to 70° C. To the flask contents are added 84 grams of flake sodium hydroxide in 21 gram increments over a period of one and one-half hours. After each addition of sodium hydroxide the following 3 steps are taken: (1) an epichlorhydrin-water azeotrope is distilled off to 130° C., (2) the flask contents are then cooled with water to 70° C., and (3) the epichlorhydrin distilled off in the azeotrope is replaced with an approximately equal amount of epichlorhydrin. The flask contents are next filtered through a Buchner funnel using a water aspirator vacuum to remove the sodium chloride present. The sodium chloride removed is washed with benzene. The filtrate is transferred to a one liter distilling flask fitted for vacuum distillation and the excess epichlorhydrin and other solvents present are distilled off at 40 mm. Hg to 160° C. The resulting composition is a 95.5 percent yield of the monoglycidyl ether of butanediol. The composition has the following properties:

| | |
|---|---|
| Theoretical epoxide equivalent | 146.0 |
| Actual epoxide equivalent | 177.0 |
| Percent total chlorine content | 0.4 |
| Percent active chlorine content | 0.2 |
| Viscosity | *$A_1$ to A |

*Gardner-Holdt.

*Example 3*

In accordance with Example 2, 134 grams of trimethylol propane and 925 grams of epichlorhydrin are heated together to 70° C. At this temperature 42 grams of flake sodium hydroxide are added to the flask contents in 21 gram increments during the ensuing hour. After each additon of sodium hydroxide an epichlorhydrin-water azeotrope is distilled off to 120° C., the flask contents are cooled to 70° C., and the epichlorhydrin distilled off is replaced with an approximately equal amount of epichlorhydrin. The flask contents are then vacuum filtered to remove the sodium chloride present. This sodium chloride is washed with benzene. The filtrate is transferred to a flask fitted for vacuum distillation and the excess epichlorhydrin and other solvents present are distilled off at 34 mm. Hg to 110° C. The resulting composition is a 98 percent yield of the monoglycidyl ether of trimethylol propane. The composition has the following properties:

| | |
|---|---|
| Theoretical epoxide equivalent | 190.0 |
| Actual epoxide equivalent | 206.0 |
| Percent total chlorine content | 1.8 |
| Percent active chlorine content | 1.7 |
| Viscosity | *R–S |

*Gardner-Holdt.

*Example 4*

Following the procedure of Example 2, 134 grams of trimethylol propane and 925 grams of epichlorhydrin are heated together to 70° C. At this temperature 84 grams of flaked sodium hydroxide are added to the flask contents in 21 gram increments over a period of two hours. After each addition of sodium hydroxide an epichlorhydrin-water azeotrope is distilled off to 120° C., the flask contents are cooled to 70° C., and the epichlorhydrin distilled off is replaced with an approximately equal amount of epichlorhydrin. The flask contents are then vacuum filtered to remove the sodium chloride. This salt is washed with benzene. The filtrate is transferred to a flask fitted for vacuum distillation and the excess epichlorhydrin and other solvents present are distilled off at 40 mm. Hg to 116° C. The resulting composition is a 94 percent yield of the diglycidyl ether of trimethylol propane. The composition has the following properties:

| | |
|---|---|
| Theoretical epoxide equivalent | 123.0 |
| Actual epoxide equivalent | 146.0 |
| Percent total chlorine content | 2.4 |
| Percent active chlorine content | 1.7 |
| Viscosity | *G–H |

*Gardner-Holdt.

It has been pointed out hereinbefore that preparation of partial glycidyl ethers of polyols by two-step processes using $BF_3$ catalysts requires use of the exact number of mols of epichlorhydrin and results in low yields because of polymer formation. To illustrate the advantage of the process of this invention as described in the foregoing examples over the two-step process, the following two-step process was carried out for the preparation of the diglycidyl ether of trimethylol propane:

In a two liter, three neck, round-bottom flask equipped with thermometer, agitator, dropping funnel and reflux condenser, 134.0 grams of trimethylol propane are heated to 50° C. with agitation at which temperature 1 cc. of boron trifluoride etherate is added and the dropwise addition of epichlorhydrin is begun. Then 185 grams of epichlorhydrin are added by means of the dropping funnel over a period of one hour, during which time the temperature of the flask contents is maintained at 60° C. to 70° C. After all the epichlorhydrin has been added the temperature of the reaction mixture is raised to 80° C. to insure complete reaction of epichlorhydrin. When the temperature reaches 80° C. the heat is then removed and 555 grams of dioxane are added to dissolve the chlorohydrin ether. Flaked sodium hydroxide (80 grams) is added to the reaction mixture in 2 increments holding the temperature between 75 and 90° C. during this dehydrohalogenating reaction. After all NaOH has reacted, heat is removed and the flask is fitted for distillation. Heat is applied and the water and some dioxane are distilled off at 100° C. The remaining solution is filtered through a Buchner funnel using a water aspirator vacuum to remove the sodium chloride present. The filtrate is transferred to a one liter distilling flask fitted for vacuum distillation and the remaining dioxane is vacuum distilled off at 60 to 70 mm. Hg to 150° C. The resulting composition is again vacuum filtered producing 179 grams of what should have theoretically been the diglycidyl ether of trimethylol propane.

The composition has the following properties:

| | |
|---|---|
| Theoretical epoxide equivalent | 123 |
| Actual epoxide equivalent | 247 |
| Percent total chlorine content | 3.98 |
| Percent active chlorine content | 0.78 |

Comparing this procedure with the diglycidyl ether of trimethylol propane made by Example 4, it is noted that the epoxide equivalent obtained by Example 4 is 146, the theoretical epoxide equivalent being 123, whereas the epoxide equivalent obtained by the two-step process is 247 indicating a presence of an excessive amount of polymer. In addition, the total chlorine content of the composition prepared in accordance with Example 4 is 2.4 percent whereas the chlorine content of the process made by the foregoing two-step process is 3.98 percent. A comparison of these two processes clearly illustrates the advantages of the process of this invention in obtaining a greater amount of the partial glycidyl ether of polyol, and in addition, the two-step process is more laborious to carry out.

What is claimed is:

1. A process for the preparation of partial glycidyl ethers of polyols which comprises: mixing a polyol having at least two hydroxyl groups, but devoid of functional groups other than hydroxyl groups, with epichlorohydrin; heating and reacting the polyol with a portion of the epichlorohydrin at a temperature of 50° C. to 150° C. in the presence of an alkali metal hydroxide; the mols of epichlorohydrin reacting with said polyol being equivalent to the mols of alkali metal hydroxide present, the amount of alkali metal hydroxide employed being at least one mol per mol of polyol but less than the total number of hydroxyl groups contained in the polyol, the mols of epichlorohydrin being in excess of the mols of caustic, said amount being at least a number of mols equal to the number of hydroxyl groups in the polyol and sufficient to act as a solvent for the partial glycidyl ether formed and recovering the partial glycidyl ethers from the reaction mixture.

2. A process for the preparation of partial glycidyl ethers of alcohols having at least two alcoholic hydroxyl groups but devoid of functional groups other than hydroxyl groups comprising dissolving the alcohol in epichlorohydrin, the ratio of alcohol to epichlorohydrin being at least one mol of epichlorohydrin per hydroxyl group of the alcohol, and sufficient to act as a solvent for the partial glycidyl ether formed, heating and reacting with this mixture at a temperature of 50° C. to 150° C., one mol of an alkali metal hydroxide and recovering the monoglycidyl ether from the reaction mixture.

3. A process for making the diglycidyl ether of a triol, trimethylol propane which comprises dissolving the triol in at least three mols of epichlorohydrin, and sufficient to act as a solvent for the partial glycidyl ether formed, heating and reacting this mixture at a temperature of 50° C. to 150° C. with two mols of an alkali metal hydroxide and recovering the diglycidyl ether of the triol from the reaction mixture.

4. A process for the preparation of partial glycidyl ethers of polyols which comprises forming a mixture of a polyol having at least two alcoholic hydroxyl groups, but devoid of functional groups other than hydroxyl groups, and epichlorohydrin, using an excess of the epichlorohydrin of at least one mol per hydroxyl group beyond that required for reaction with the polyol, reacting the epichlorohydrin and the polyol at a temperature of 50° C. to 150° C., catalyzing the reaction with less than one mol of an alkali metal hydroxide per aliphatic hydroxyl group of the polyol to bring about the reaction of one mol of epichlorohydrin with one alcoholic hydroxyl group per each mol of hydroxide used, the number of glycidyl substituents desired on the polyol being determined by the amount of hydroxide by virtue of the fact that under reaction conditions only one mol of epichlorohydrin condenses with the polyol for each mol of caustic employed, and maintaining the temperature in the 50° C. to 150° C. range until dehydrochlorination occurs.

References Cited in the file of this patent

UNITED STATES PATENTS

| | | |
|---|---|---|
| 2,464,753 | Shokal et al. | Mar. 15, 1949 |
| 2,538,072 | Zech | Jan. 16, 1951 |
| 2,615,007 | Greenlee | Oct. 21, 1952 |
| 2,615,008 | Greenlee | Oct. 21, 1952 |
| 2,698,315 | Greenlee | Dec. 28, 1954 |
| 2,731,444 | Greenlee | Jan. 17, 1956 |
| 2,758,119 | Bell | Aug. 7, 1956 |
| 2,854,461 | De Groote et al. | Sept. 30, 1958 |
| 3,017,387 | Schwarzer et al. | Jan. 16, 1962 |
| 3,033,803 | Price et al. | May 8, 1962 |
| 3,033,816 | Price et al. | May 8, 1962 |

FOREIGN PATENTS

| | | |
|---|---|---|
| 509,455 | Canada | Jan. 25, 1955 |

OTHER REFERENCES

Stephenson: Jour. Chemical Soc., pages 1571–1577 (May 1954).